(12) United States Patent
Merry et al.

(10) Patent No.: US 7,950,220 B2
(45) Date of Patent: May 31, 2011

(54) TURBINE ENGINE COMPRESSOR

(75) Inventors: Brian D. Merry, Andover, CT (US);
Gabriel L. Suciu, Glastonbury, CT (US); John P. Nikkanen, West Hartford, CT (US)

(73) Assignee: United Technologies Corporation, Hartford, CT (US)

( * ) Notice: Subject to any disclaimer, the term of this patent is extended or adjusted under 35 U.S.C. 154(b) by 1106 days.

(21) Appl. No.: 11/455,980

(22) Filed: Jun. 19, 2006

(65) Prior Publication Data
US 2010/0218478 A1    Sep. 2, 2010

(51) Int. Cl.
*F02K 3/00* (2006.01)

(52) U.S. Cl. .......... 60/268; 60/39.162; 60/772; 60/774; 60/791; 415/65; 415/68; 415/69

(58) Field of Classification Search .............. 60/39.162, 60/268, 772, 774, 791; 415/65, 68, 69
See application file for complete search history.

(56) References Cited

U.S. PATENT DOCUMENTS

| | | | | |
|---|---|---|---|---|
| 2,702,985 A * | 3/1955 | Howell | ........................ | 60/226.1 |
| 3,363,831 A * | 1/1968 | Garnier | ........................... | 415/65 |
| 3,448,582 A * | 6/1969 | Bracey et al. | ................ | 60/226.1 |
| 3,673,802 A * | 7/1972 | Krebs et al. | ................. | 60/226.1 |
| 4,159,624 A * | 7/1979 | Gruner | ....................... | 60/39.183 |
| 5,795,200 A * | 8/1998 | Larkin | ............................. | 440/81 |
| 6,895,741 B2 * | 5/2005 | Rago et al. | ................... | 60/226.1 |
| 2005/0172610 A1 | 8/2005 | Bart et al. | | |
| 2008/0098718 A1 | 5/2008 | Henry et al. | | |

FOREIGN PATENT DOCUMENTS

| | | |
|---|---|---|
| EP | 0558769 A1 | 9/1993 |
| GB | 2194593 A | 3/1988 |
| JP | 1136984 A | 2/1999 |
| JP | 2927790 B2 | 5/1999 |

OTHER PUBLICATIONS

European Search Report for EP Patent Application No. 07252469.7, dated Nov. 11, 2010.

* cited by examiner

*Primary Examiner* — Michael Cuff
*Assistant Examiner* — Craig Kim
(74) *Attorney, Agent, or Firm* — Bachman & LaPointe, P.C.

(57) ABSTRACT

A counter-rotating blade stage in lieu of a stator stage may compensate for relatively low rotational speed of a gas turbine engine spool. A first spool may have at least two compressor blade stage and at least two turbine blade stage. A combustor is located between the at least two compressor blade stage and the at least two turbine blade stage along a core flowpath. The at least two counter-rotating compressor blade stage is interspersed with the first spool at least two compressor blade stage. A transmission couples the at least two additional compressor blade stage to the first spool for counter-rotation about the engine axis.

20 Claims, 3 Drawing Sheets

TURBINE ENGINE COMPRESSOR

BACKGROUND OF THE INVENTION

The invention relates to gas turbine engines. More particularly, the invention relates to low pressure compressor sections of multi-spool turbofan engines.

A gas turbine engine may have one or more spools. Each spool may, for example, include the blades of associated compressor and turbine sections and a connecting shaft. Two- and three-spool engines are known. An exemplary two-spool engine included low and high speed spools. At cruise conditions, exemplary low spool speeds are 2000-7000 revolutions per minute (RPM) while exemplary high spool speeds are 9000-21000 RPM. The low spool includes low speed/pressure compressor and turbine (LPC and LPT) blades while the high spool includes high speed/pressure compressor and turbine (HPC and HPT) blades. A core flowpath through the engine may sequentially pass through the LPC, HPC, combustor, HPT, and LPT.

In a turbofan engine, a fan drives air along a bypass flowpath. In many engines, the fan may be mounted as part of the low speed spool and may be partially integrated with the LPC. In designing an engine, there may be a mismatch between desirable fan speed and desirable low spool speed. Particularly in high bypass turbofan engines it is advantageous that the fan speed be less than the low spool speed. In an exemplary intermediate speed compromise, the fan may be smaller than otherwise desired and the LPC and LPT may have a greater number of blade stages than otherwise desired. As an alternative, the low spool may drive the fan through a reduction gearing system (e.g., an epicyclic system). This permits the LPC and LPT to operate at the relatively high speeds at which they are efficient while the much larger diameter fan operates at the relatively lower speeds at which it is efficient.

SUMMARY OF THE INVENTION

One aspect of the invention involves compensating for low spool speed by providing a compressor with at least one counter-rotating blade stage in lieu of a stator stage. Thus, a first spool may have at least one compressor blade stage and at least one turbine blade stage. A combustor is located between the at least one compressor blade stage and the at least one turbine blade stage along a core flowpath. The at least one counter-rotating compressor blade stage is interspersed with the first spool at least one compressor blade stage. A transmission couples the at least one additional compressor blade stage to the first spool for counter-rotation about the engine axis.

In various implementations, the engine may be a turbofan. At least one compressor blade stage and at least one turbine blade stage may, respectively, be of a low speed/pressure compressor (LPC) and a low speed/pressure turbine (LPT). The engine may further have a high speed/pressure compressor (HPC) and a high speed/pressure turbine (HPT). The HPC, HPT, and LPC may be conventional sections having blades and stator vanes but lacking counter-rotating blades.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
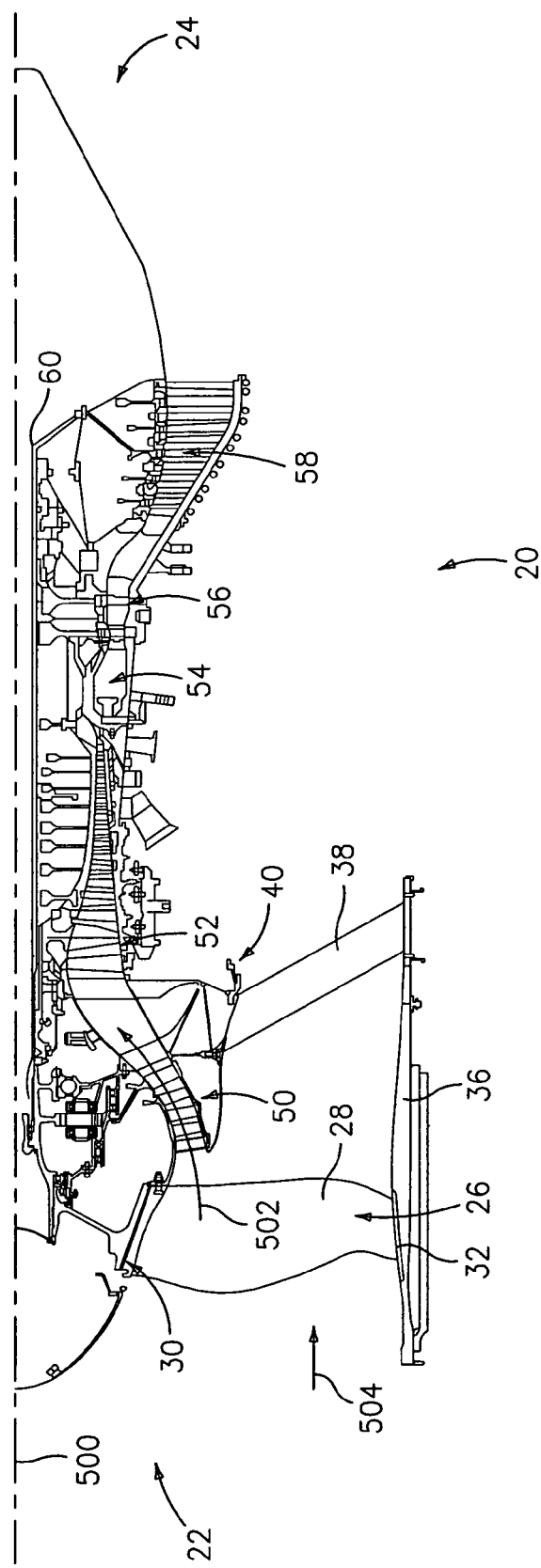
FIG. 1 is a partial sectional view of a turbofan engine according to the present invention.

FIG. 1 shows a turbofan engine 20 having a central longitudinal axis 500. The engine has a core flowpath 502 and a bypass flowpath 504. The engine has a forward/inlet/upstream end 22 and an aft/outlet/downstream end 24. At upstream ends of the core and bypass flowpaths, the engine has a fan 26 comprising a circumferential array of blades 28 extending from inboard platforms 30 to outboard tips 32. The exemplary tips are closely spaced apart from the inboard surface of a shroud 36. The shroud may be held by a circumferential array of struts 38 extending from a structural case 40.

Proceeding downstream along the core flowpath 502, the engine has a low pressure compressor (LPC) section 50, a high pressure compressor (HPC) section 52, a combustor section 54, a high pressure turbine (HPT) section 56, and a low pressure turbine (LPT) section 58. The exemplary engine includes a low speed spool shaft 60. An exemplary high speed spool may be formed as a rotor stack (e.g., without a center tie spool) or may have a shaft. In an exemplary implementation, each of the HPC, HPT, and LPT may comprise a plurality of interspersed stages of rotating blades and non-rotating stator vanes. In the engine 20, however, the LPC 50 comprises two groups of interspersed counter-rotating blade stages. A first group may be formed on the low speed spool. The second group may effectively replace one or more LPC stator stages.

Figure 2:
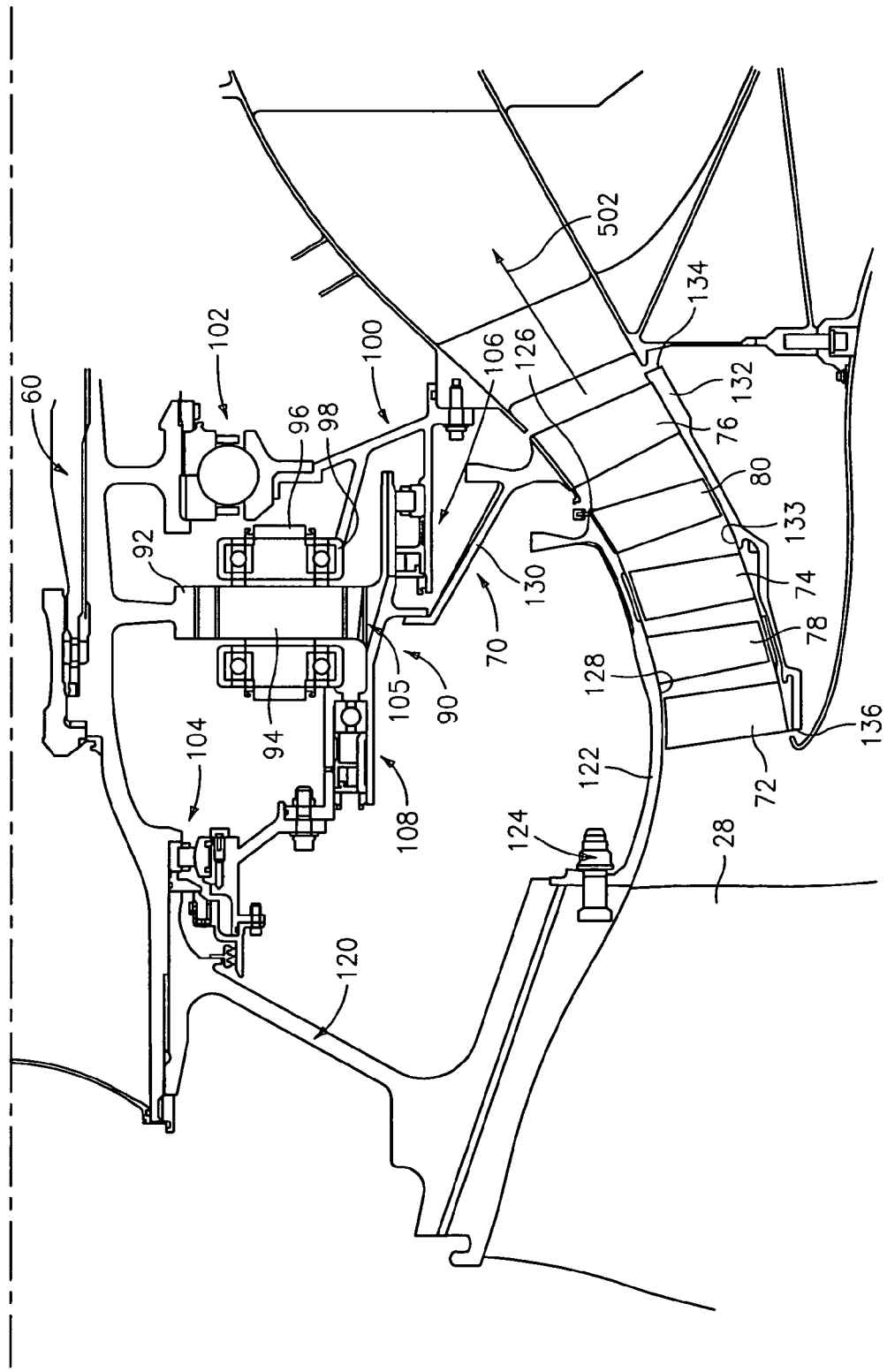
FIG. 2 is an enlarged view of a low pressure compressor section of the engine of FIG. 1.

In the example of FIG. 2, a counter-rotating compressor spool 70 has blade stages 72, 74, and 76 interspersed with blade stages 78 and 80 of the low speed spool. In the particular example of FIG. 2, from upstream-to-downstream, these are arranged as 72, 78, 74, 80, and 76. The counter-rotation of the spool 70 may be driven by a transmission 90. The exemplary transmission 90 is an epicyclic transmission having a central externally-toothed sun gear 92 mounted to the shaft 60. A circumferential array of externally-toothed idler gears 94 are engaged to the gear 92. The exemplary gears 94 are carried on journals 96 carried by a carrier ring 98. The exemplary carrier ring 98 is fixedly mounted relative to an engine static structure 100. The static structure 100 is coupled to the shaft 60 via multiple bearing systems 102 and 104 to permit rotation of the shaft 60.

The transmission 90 further includes an internally-toothed ring gear 105 encircling and engaged to the gears 94. The exemplary ring gear 105 is supported relative to the static structure by one or more bearing systems 106 and 108. The exemplary transmission 90 causes a counter-rotation of the spool 70 relative to the low speed spool. In the example of FIG. 2, the fan blades 28 are mounted via a hub 120 to the shaft 60. At an outboard rear end of the hub 120, a blade platform ring 122 is secured (e.g., via a bolt circle 124). The platform ring 122 extends to an aft end 126.

An outboard surface 128 of the platform ring 122 locally forms an inboard boundary of the core flowpath 502. The blades of stages 78 and 80 extend from inboard ends fixed to (e.g., unitarily cast/machined with or mounted to) the platform ring 122 to free outboard tips. In the example of FIG. 2, the blades of the downstreammost stage 76 of the spool 70 are mounted to an outboard end of a support 130. The outboard ends of the blades of the stage 76 are secured relative to a shroud ring 132 (e.g., unitarily cast/machined with or mounted to). The inboard surface 133 of the shroud ring 132 forms a local outboard boundary of the core flowpath 502. The exemplary shroud ring 132 has an aft/downstream end 134 adjacent the blade stage 76 and extends forward to an upstream end 136. The outboard ends of the blades of the stages 72 and 74 are mounted to the shroud ring 132. These blades have free inboard ends adjacent the platform ring 122 outboard surface 128. The support 130 is affixed to the ring gear 105 to drive rotation of the blades of stage 76 and, through the shroud ring 132, the blades of stages 72 and 74.

In an exemplary implementation, a ratio of the rotational speed of the spool 70 to that of the low spool is between −0.4:1 and −0.8:1, more narrowly, between −0.6:1 and −0.7:1. A speed ratio of the high spool relative to the low spool may be condition dependent. An exemplary ratio of high spool speed to low spool speed at steady-state cruise conditions is between 1.5:1 and 4.5:1, more narrowly, 2.5:1 and 4:1.

In a reengineering situation relative to a baseline conventional turbofan engine, the number of LPC stages may be reduced. This may help create a more longitudinally compact engine. Engine weight may also be reduced as may part count. Reliability may potentially be increased. Additionally, the pressure ratio of the engine could be increased to increase thrust while maintaining the baseline engine length.

Figure 3:
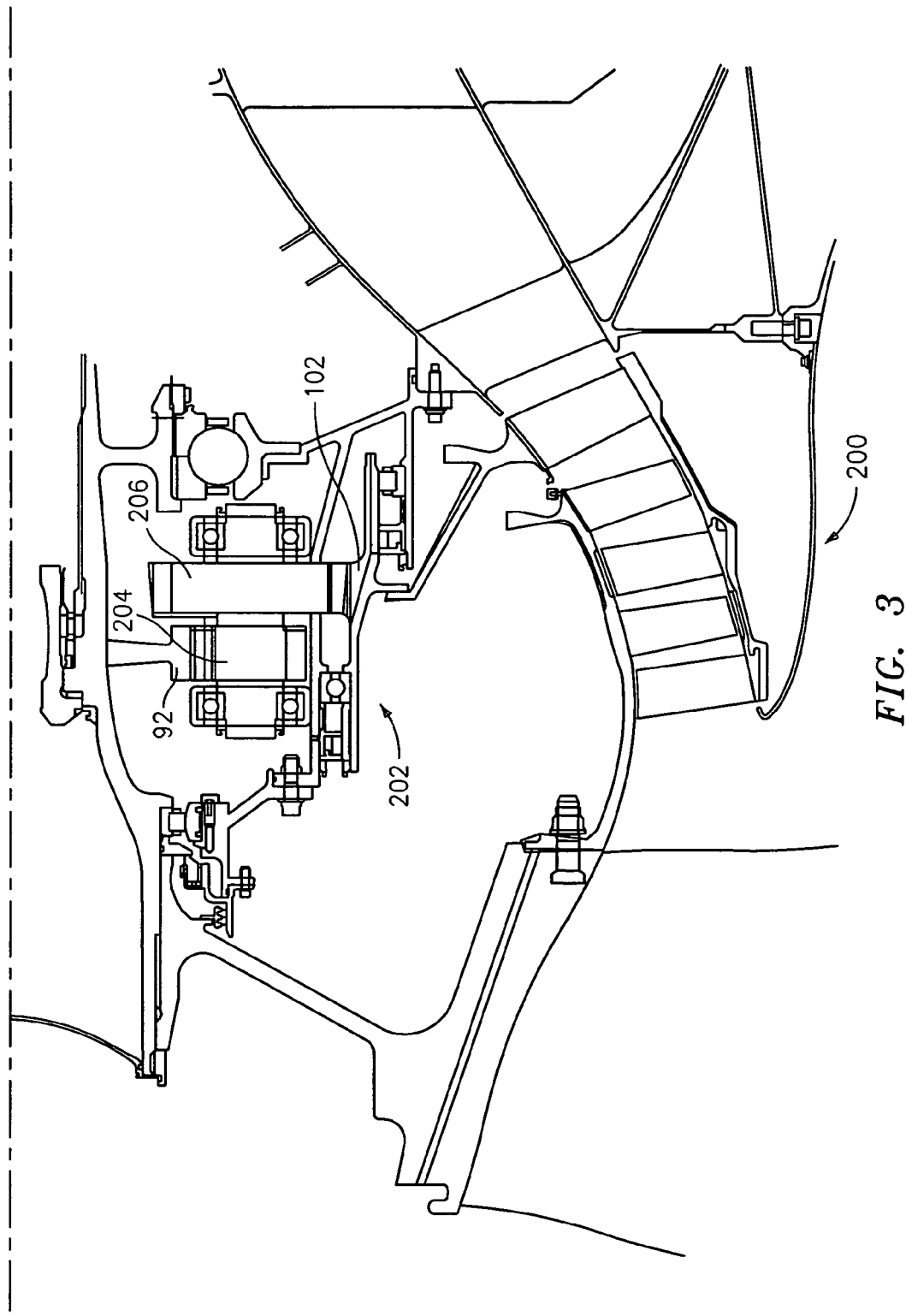
FIG. 3 is a view of an alternate low pressure compressor.

FIG. 3 shows an alternate LPC 200 which may be otherwise similar to the LPC 50 but has a different transmission 202. The transmission 202 may be otherwise similar to the transmission 90. However, it has irrotatably connected pairs of idler gears 204 and 206. The gears 204 engage the gear 92 whereas the gears 206 engage the ring gear 105. The exemplary gears 206 are of larger diameter than their associated gears 204 so as to increase the rotational speed of spool 70 beyond the speed capability of a similarly dimensioned transmission 90. An exemplary ratio of the rotational speed of the spool 70 to that of the low spool is between −0.7:1 and −2:1, more narrowly, between −1:1 and −1.25:1.

An exemplary engine family could be provided wherein several otherwise similar or identical engines could have different gear ratios to provide different pressure ratios (and thus thrusts). In this family, increased pressure ratio and thrust would be associated with increased magnitude of the speed of the spool 70. For example, amongst the family members, the aerodynamics of the LPC (e.g., blade count, blade size, and airfoil shape) could be preserved. Although the LPT could be similarly preserved, the changes in pressure ratio would tend to favor providing some corresponding LPT changes.

Among alternative variations are geared turbofans wherein the counter-rotating spool is driven directly or indirectly by the fan transmission.

In another exemplary reengineering situation, further changes may be made to the HPC and HPT. For example, by maintaining stage count or even adding stages to the LPC, the HPC may be unloaded. This facilitates reduction in the number of HPC stages and the associated HPC part count and cost. This would be appropriate in an extensive reengineering or a clean sheet engine design due to difficulties in removing stages from an existing compressor.

One or more embodiments of the present invention have been described. Nevertheless, it will be understood that various modifications may be made without departing from the spirit and scope of the invention. For example, when implemented as a reengineering of an existing engine configuration, details of the existing configuration may influence details of any particular implementation. Accordingly, other embodiments are within the scope of the following claims.

What is claimed is:

1. A gas turbine engine comprising:
    a first spool having:
        at least one compressor blade stage; and
        at least one turbine blade stage;
    a combustor between the at least one compressor blade stage and the at least two turbine blade stage along a core flowpath;
    at least two additional compressor blade stages interspersed with the first spool at least one compressor blade stage; and
    a transmission coupling the at least two additional compressor blade stages to the first spool at a fixed ratio for counter-rotation about an engine axis, the blades of at least a stage of the at least two additional blade stages coupled to the transmission inboard and a shroud outboard and unitarily cast or machined with the shroud as a single piece, the blades of at least another of the least two additional blade stages being separately formed from and then mounted to the shroud.

2. The gas turbine engine of claim 1 wherein:
    the blades of at least another stage of the at least two additional blade stages are coupled to the shroud outboard so as to be driven by the transmission via said stage and the shroud.

3. The gas turbine engine of claim 1 wherein:
    the transmission has gearing effective to rotate the at least two additional blade stages at said fixed ratio relative to the first spool of between −0.4:1 and −0.8:1.

4. The gas turbine engine of claim 1 wherein:
    the transmission comprises:
        a central gear on the first spool;
        a circumferential array of second gears engaged to the first gear; and
        a ring gear engaged to the second gears and nonrotatably coupled to the at least two additional blade stages.

5. The gas turbine engine of claim 1 wherein:
    the transmission comprises:
        a central gear on the first spool;
        a circumferential array of pairs of second and third gears, the second gears engaged to the first gear;
        a carrier holding the pairs for rotation about associated axes; and
        a ring gear engaged to the third gears and nonrotatably coupled to the at least two additional blade stages.

6. The gas turbine engine of claim 5 wherein:
    the third gears are larger than the second gears.

7. The gas turbine engine of claim 1 further comprising:
    a second spool having:
        at least one compressor blade stage between the first spool at least one compressor blade stage and the combustor along the core flowpath; and
    at least one turbine blade stage between the first spool at least one turbine blade stage and the combustor along the core flowpath.

8. The gas turbine engine of claim 7 wherein:
    there are at least two of said first spool compressor blade stages; and
    there are at least two of said first spool turbine blade stages.

9. The gas turbine engine of claim 7 further comprising:
    a fan driven by the first spool.

10. The gas turbine engine of claim 9 wherein:
    the fan rotates with the first spool as a unit.

11. The gas turbine engine of claim 1 further comprising:
    a fan driven by the first spool.

12. A method for operating the gas turbine engine of claim 1, the method comprising:
compressing the air in the compressor of the gas turbine engine, comprising a plurality of blade stages on a first spool and an interspersed plurality of counter-rotating second blade stages, the compressing comprising rotating the additional blade stages at a fixed ratio relative to the first spool of between −0.4:1 and −2:1;
mixing the air with a fuel;
combusting the fuel and air in the combustor; and passing combustion products from the combustor to the turbine section consisting essentially of a plurality of interspersed stator stages and first spool blade stages, including said turbine blade stage, to drive rotation of the first spool.

13. The method of claim 12 wherein:
the compressing comprises rotating the additional blade stages at a fixed ratio relative to the first spool of between −0.4:1 and −2:1.

14. The method of claim 12 further comprising:
further compressing the air in a second compressor consisting essentially of a plurality of blade stages on a second spool and an interspersed plurality of stator vanes; and
passing the combustion products to the turbine section from a second turbine section consisting essentially of a plurality of interspersed stator stages and second spool blade stages to drive rotation of the second spool.

15. The method of claim 12 wherein:
the compressing comprises rotating the second blade stages at a fixed ratio relative to the first spool of between −0.4:1 and −2:1;
the first spool rotates at a speed of 2000-7000 RPM; and
the second spool rotates at a speed of 9000-21000 RPM and at a non-fixed magnitude ratio relative to the first spool of between 1.5:1 and 4:1.

16. The gas turbine engine of claim 2 further comprising: a second spool having:
at least one compressor blade stage between the first spool at least one compressor blade stage and the combustor along the core flowpath; and
at least one turbine blade stage between the first spool at least one turbine blade stage and the combustor along the core flowpath.

17. The gas turbine engine of claim 2 further comprising:
a fan driven by the first spool.

18. The gas turbine engine of claim 4 further comprising:
a second spool having:
at least one compressor blade stage between the first spool at least one compressor blade stage and the combustor along the core flowpath; and
at least one turbine blade stage between the first spool at least one turbine blade stage and the combustor along the core flowpath.

19. The gas turbine engine of claim 4 further comprising:
a fan driven by the first spool.

20. A gas turbine engine comprising:
a first spool having:
at least one compressor blade stage; and
at least one turbine blade stage;
a combustor between the at least one compressor blade stage and the at least one turbine blade stage along a core flowpath;
at least one additional compressor blade stage interspersed with the first spool at least one compressor blade stage, one or both having at least two stages, a stage of the at least one additional compressor blade stage having outboard ends unitarily cast or machined with a shroud ring and one or more further stages of said at least one additional compressor blade stage being mounted to the shroud ring; and
a transmission coupling the at least one additional compressor blade stage to the first spool for counter-rotation about an engine axis, the transmission comprising:
a central gear on the first spool;
a circumferential array of pairs of second and third gears, the second gears engaged to the first gear;
a carrier holding the pairs for rotation about associated axes; and
a ring gear engaged to the third gears and nonrotatably coupled to the at least one additional blade stage.

* * * * *